(12) United States Patent  
Saito et al.

(10) Patent No.: US 8,999,450 B2  
(45) Date of Patent: Apr. 7, 2015

(54) METAL SALT-CONTAINING COMPOSITION, SUBSTRATE, MANUFACTURING METHOD OF SUBSTRATE

(75) Inventors: Yasuteru Saito, Osaka (JP); Naoki Ike, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 244 days.

(21) Appl. No.: 13/498,563

(22) PCT Filed: Sep. 28, 2009

(86) PCT No.: PCT/JP2009/004912  
§ 371 (c)(1),  
(2), (4) Date: Jun. 1, 2012

(87) PCT Pub. No.: WO2011/036730  
PCT Pub. Date: Mar. 31, 2011

(65) Prior Publication Data  
US 2012/0230900 A1    Sep. 13, 2012

(51) Int. Cl.  
*B05D 3/02* (2006.01)  
*C01G 25/02* (2006.01)  
*C01G 3/00* (2006.01)  
*C01G 3/02* (2006.01)  
(Continued)

(52) U.S. Cl.  
CPC *C01G 25/02* (2013.01); *C01G 3/00* (2013.01); *C01G 3/02* (2013.01); *C01G 9/00* (2013.01); *C01G 9/02* (2013.01); *C01G 15/00* (2013.01); *C01G 19/02* (2013.01); *C01G 23/04* (2013.01); *C01G 33/00* (2013.01); *C01G 37/027* (2013.01); *C01G 39/02* (2013.01); *C01G 49/02* (2013.01); *C01G 53/04* (2013.01); *C01P 2004/03* (2013.01); *C01P 2006/82* (2013.01); *C23C 18/1216* (2013.01); *C23C 18/1283* (2013.01)

(58) Field of Classification Search  
USPC ........................................................ 427/376.2  
See application file for complete search history.

(56) References Cited

U.S. PATENT DOCUMENTS 3,873,349 A    3/1975 Kimura et al.  
5,273,776 A    12/1993 Yonezawa et al.  
(Continued)

FOREIGN PATENT DOCUMENTS

GB    2 262 107 A    6/1993  
JP    57-200209    12/1982  
(Continued)

OTHER PUBLICATIONS

Search Report for Chinese Patent Application No. 200980161771.6, dated Aug. 23, 2013.  
(Continued)

*Primary Examiner* — Nathan Empie  
(74) *Attorney, Agent, or Firm* — Marshall, Gerstein & Borun LLP

(57) ABSTRACT

An object of the present invention is to provide a method for manufacturing a substrate having a metal complex film on the surface thereof. According to the present invention, a metal salt-containing composition containing a metal salt, a polyvalent carboxylic acid having a cis-form structure, and a solvent, in which: the molar ratio of the polyvalent carboxylic acid to the metal salt is not less than 0.5 and not more than 4.0; the moisture content of the composition is not less than 0.05% by weight is used in an application method to apply on a substrate. Thereafter, a two-step heat treatment is carried out.

5 Claims, 5 Drawing Sheets

(51) Int. Cl.
*C01G 9/00* (2006.01)
*C01G 9/02* (2006.01)
*C01G 15/00* (2006.01)
*C01G 19/02* (2006.01)
*C01G 23/04* (2006.01)
*C01G 33/00* (2006.01)
*C01G 37/027* (2006.01)
*C01G 39/02* (2006.01)
*C01G 49/02* (2006.01)
*C01G 53/04* (2006.01)
*C23C 18/12* (2006.01)

(56) References Cited

U.S. PATENT DOCUMENTS

2005/0003085 A1 1/2005 Yonekura et al.
2005/0131162 A1* 6/2005 Tanaka et al. ............ 525/329.7

FOREIGN PATENT DOCUMENTS

| JP | 64-011977 U | 1/1989 |
| JP | 09-012976 A | 1/1997 |
| JP | 11-256342 A | 9/1999 |
| JP | 2003-183009 A | 7/2003 |
| JP | 2003-267705 A | 9/2003 |
| JP | 2004-075511 A | 3/2004 |
| JP | 2005-029408 A | 2/2005 |
| JP | 2008-169059 A | 7/2008 |

OTHER PUBLICATIONS

International Search Report for PCT/JP2009/004912, dated Nov. 2, 2009.

Extended European Search Report for Application No. 09849761.3, dated Jan. 2, 2014.

* cited by examiner

METAL SALT-CONTAINING COMPOSITION, SUBSTRATE, MANUFACTURING METHOD OF SUBSTRATE

TECHNICAL FIELD

The present invention relates to a metal salt-containing composition for use in forming a metal oxide film on a substrate, and more specifically to a metal salt-containing composition containing a metal salt, a polyvalent carboxylic acid having a cis-form structure, and a solvent (which may include water). In addition, the present invention relates to a metal complex film obtained using such a metal salt-containing composition and a substrate having a metal oxide thin film formed on the surface thereof, and a method for manufacturing a substrate having a metal oxide thin film formed on the surface thereof.

BACKGROUND ART

As techniques for coating a variety of metal compound thin films on the surface of various types of substrates, a sputtering method, gas phase methods such as a vacuum deposition method, a sol-gel method, solution methods by thermal decomposition etc., of an organic acid metal salt or an organic metal complex have been known.

First, the sputtering method enables a compact and homogenous metal compound thin film to be formed on the surface of a substrate, and has been predominantly employed for the present. However, in the case in which the surface of the substrate has a complicated shape, it is impossible to form a metal oxide thin film on recessed portions.

Next, the gas phase methods are procedures that require high costs since it is necessary to prepare a thin film under a high-vacuum atmosphere. In addition, there is a problem of difficulty in obtaining a metal compound thin film having high crystallinity. Further, similarly to the sputtering method, to form a metal oxide thin film on recessed portions is impossible when the surface of the substrate has a complicated shape.

Subsequently, the sol-gel method requires time-consuming hydrolysis and polycondensation steps of the source material such as a metal alkoxide, in addition, there is a problem of not capable of readily applying when gelated due to difficulty in controlling the gelation reaction.

Finally, the solution method in which an organic acid metal salt or an organic metal complex is thermally decomposed enables a metal oxide thin film to be formed under an ordinary pressure even on the surface having a complicated shape. This method is a comparatively simple method since a thin film can be formed by merely carrying out thermal decomposition in the air under an ordinary pressure after an organic acid metal salt or an organic metal complex to be a precursor is dissolved in an organic solvent, and the solution is applied on the substrate with spin coating or the like. However, as in the sputtering method, formation of a compact and homogenous metal oxide thin film is difficult, and there is a problem of applicability to only limited source materials such as acetic acid salts, alkoxides and the like.

CITATION LIST

Patent Literature

PTL 1: Japanese Patent-Laid-open Publication No. 2003-267705

PTL 2: Japanese Patent-Laid-open Publication No. H09-012976

PTL 3: Japanese Patent-Laid-open Publication No. S64-11977

PTL 4: Japanese Patent-Laid-open Publication No. H11-256342

Nonpatent Literature

NPL 1: "Sol-gel Method and Organic-inorganic Hybrid Material" Technical Information Society, Aug. 31, 2007, P. 3-17

SUMMARY OF INVENTION

Technical Problem

In the prior arts described above, a uniform metal oxide thin film can be formed on a substrate only when a certain metal salt such as an alkoxide, acetic acid salt or the like is used. Therefore, a method in which more kinds of metal source materials can be used, and enables a compact and uniform metal oxide thin film to be readily produced has been demanded.

An object of the present invention is to provide a metal salt-containing composition which is applicable to many metal source materials, and can be used for forming a compact and uniform metal oxide film comparable to those formed according to the sputtering method. In addition, another object of the present invention is to provide a substrate having a metal complex film on the surface thereof obtained using such a metal salt-containing composition, and a substrate having a metal complex film on the surface thereof obtained by further heating such a substrate. Moreover, still another object of the present invention is to provide a method for manufacturing a substrate having such a metal complex film on the surface thereof.

Solution to Problem

The present inventors thoroughly investigated on a method of forming a metal oxide thin film on a substrate composed of a material such as a glass, silicon, metal or ceramic by an application method, and consequently found that a compact and homogenous metal oxide thin film can be formed on a substrate when a metal compound to be a metal source material is mixed at a specified rate with a polyvalent carboxylic acid having at least one cis-form structural site, and a solution is prepared by dissolving the mixture in a solvent including water (metal salt-containing composition) is provided as an application liquid. Accordingly, the present invention was accomplished.

Specifically, one aspect of the present invention relates to a metal salt-containing composition comprising
a metal salt,
a polyvalent carboxylic acid having a cis-form structure of
—C(COOH)=C(COOH)—, and
a solvent, wherein:
the molar ratio of the polyvalent carboxylic acid to the metal salt is not less than 0.5 and not more than 4.0;
the moisture content of the composition is not less than 0.05% by weight; and
the composition is used for forming a metal oxide thin film by applying on a substrate followed by baking.

Still further, another aspect of the present invention relates to a substrate having a metal complex film formed on the surface thereof, the metal complex film being obtained by:

applying on the surface of the substrate a solution comprising a metal salt, a polyvalent carboxylic acid having a cis-form structure of —C(COOH)=C(COOH)—, and a solvent, the molar ratio of the polyvalent carboxylic acid to the metal salt being not less than 0.5 and not more than 4.0, and the moisture content of the solution being not less than 0.05% by weight; and drying by heating at a temperature of not lower than 100° C. and not higher than 250° C.

Additionally, still another aspect of the present invention relates to a method for manufacturing a substrate having an oxidized metal thin film formed on the surface thereof, the method comprising:

an application step of applying on the surface of the substrate a solution comprising a metal salt, a polyvalent carboxylic acid having a cis-form structure of —C(COOH)=C(COOH)—, and a solvent, the molar ratio of the polyvalent carboxylic acid to the metal salt being not less than 0.5 and not more than 4.0, and the moisture content of the solution being not less than 0.05% by weight;

a primary heating step of drying by heating the solution at a temperature of not lower than 100° C. and not higher 250° C.; and a secondary heating step of further heating the substrate after the primary heating step at a temperature no lower than 400° C.

The cis-form structural site is identified to be necessary since uniformity of the metal oxide thin film obtained on the substrate was deteriorated when a polyvalent carboxylic acid not having a cis-form structural site was used. It is to be noted that C=C bond of the polyvalent carboxylic acid in the present invention may be a carbon-carbon double bond that composes an aromatic ring.

Herein, it is necessary that the solution containing a metal salt, a polyvalent carboxylic acid having a cis-form structure, and a solvent (application liquid) has a moisture content of not less than 0.05% by weight as a solution. The metal salt may be a hydrate, and the solvent may include water. The moisture of not less than 0.05% by weight contained in the entirety of the application liquid is sufficient.

When the amount of the polyvalent carboxylic acid added relative to the amount of the metal salt is too small, uniformity of the metal oxide thin film is deteriorated. Whereas, when the amount is too large, the amount of organic matter in the film on the substrate becomes too large in baking; therefore, the uniformity of the film is deteriorated. Accordingly, the molar ratio of the polyvalent carboxylic acid to the metal salt is preferably not less than 0.5 and not more than 4.0, and more preferably not less than 0.8 and not more than 2.0.

The content (concentration) of the metal salt in the metal salt-containing composition (application liquid) is not particularly limited since it is sufficient as long as the metal salt is dissolved in the solvent, and may be adjusted ad libitum depending on the intended film thickness of the metal oxide thin film. In light of attaining a practically applicable film thickness, the content of the metal salt is preferably not less than 0.005 mol/L and not more than 1 mol/L.

The metal salt-containing composition is prepared into an application liquid and can be applied on the substrate by a well-known procedure in application methods carried out using a spray, spin coating, screen printing, an applicator, a bar coater, a roll coater, a gravure coater or the like. In this process, the application liquid is preferably applied such that a uniform film thickness is attained in the application to meet the characteristics of the application procedure.

Although a solvent which can be used in the present invention is not particularly limited as long as the metal salt and the polyvalent carboxylic acid can be stably dissolved, for example, water, methanol, ethanol, ethylene glycol, propylene glycol, 1,3-propanediol, 1,3-butanediol, 3-methoxymethylbutanol, N-methylpyrrolidone, terpineol, and the like may be exemplified.

The metal salt is preferably at least one salt selected from the group consisting of Mg, Ca, Sr, Ba, Y, Ti, Zr, Hf, Nb, Ta, Cr, W, Fe, Ni, Cu, Ag, Zn, Al, Ga, In, Sn and Sb.

The metal salt is preferably at least one metal salt selected from the group consisting of a nitric acid salt, a sulfuric acid salt, a carboxylic acid salt, a halide, an alkoxide and an acetyl acetone salt.

The polyvalent carboxylic acid is preferably at least one selected from the group consisting of maleic acid, citraconic acid, phthalic acid and trimellitic acid. In view of a low decomposition temperature, and ability to provide a more compact metal oxide thin film, maleic acid is particularly preferred. Also, the polyvalent carboxylic acid may be generated in the solution by using an anhydride of the polyvalent carboxylic acid with a solvent including water.

In addition, another aspect of the present invention relates to a substrate having a metal oxide film formed on the surface thereof from a substrate having a metal complex film formed on the surface thereof, the metal complex film being obtained by:

applying on the surface of the substrate a solution comprising a metal salt, a polyvalent carboxylic acid having a cis-form structure of —C(COOH)=C(COOH)—, and a solvent, the molar ratio of the polyvalent carboxylic acid to the metal salt being not less than 0.5 and not more than 4.0, and the moisture content of the solution being not less than 0.05% by weight; and drying by heating at a temperature of not lower than 100° C. and not higher than 250° C., and further heating thus obtained substrate at a temperature of not lower than 400° C.

The aforementioned objects, other objects, features, and advantages of the present invention are clarified by the following detailed description of preferred embodiments with reference to accompanying drawings.

Advantageous Effects of Invention

According to the present invention, various types of metal source materials are adopted to an application method, and thus production of a more compact and uniform metal oxide thin film than those obtained according to conventional application methods is enabled on a substrate at low costs.

DESCRIPTION OF EMBODIMENTS

Figure 1:
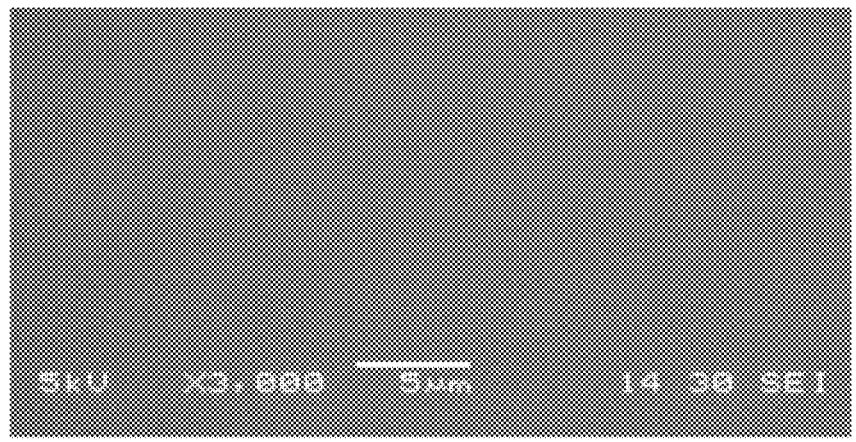
FIG. 1 shows an SEM photograph illustrating the surface of the substrate after primary heating of Example 1.

Hereinafter, modes for carrying out the present invention are explained with appropriate reference to accompanying drawings.

Example 1

Zinc nitrate hexahydrate in an amount of 0.8924 g (0.003 mol), 0.5221 g (0.0045 mol) of maleic acid and 7.96 g of 3-methoxy-3-methyl-1-butanol (MMB, product name: Solfit Fine Grade, manufactured by Kuraray Co., Ltd.) were mixed, and the mixture was subjected to an ultrasonic treatment in an ultrasonic bath for 10 to 30 min to prepare a solution having a metal salt content of 0.3 mol/L (metal salt-containing composition), and the properties were identified.

Next, after the prepared solution was spin coated at 2,000 rpm for 30 sec on a slide glass (glass substrate), primary heating was carried out in an air dry furnace at 150° C. for 10 min. Thereafter, the appearance of the metal complex thin film formed on the surface of the substrate was observed. Moreover, after the substrate was subjected to secondary heating (baking) in the air in an electric muffle furnace at 500° C. for 30 min, the appearance of the metal oxide thin film formed on the surface of the substrate was observed. It is to be noted that the metal complex thin film and the metal oxide thin film formed on the surface of the substrate had a film thickness falling within the range of not less than 0.03 μm and not more than 0.05 μm.

Examples 2 to 46

Similar operations to those in Example 1 were carried out except that the metal salt, the polyvalent carboxylic acid, the molar ratio, and the solvent were changed. In addition, the appearances of the surface of the substrate after the primary heating and the secondary heating were observed. The compositions and results of observation in Examples 1 to 46 are shown in Table 1.

In Table 1, the molar ratio means a molar ratio of the polyvalent carboxylic acid to the metal salt. Appearance 1 means the appearance of the metal complex thin film after the primary heating, and Appearance 2 means the appearance of the metal oxide thin film after the secondary heating. Crack means the presence or absence of crack on the metal oxide thin film after the secondary heating. Furthermore, in Examples 43 to 46, a mixture of two kinds of the metal nitric acid salts in equimolar amounts was used.

Also, 3-methoxy-3-methyl-1-butanol (MMB) in Table 1 and Table 2 described later contains about 0.05% by weight of water.

TABLE 1

| Example | Metal | Anion | Polyvalent carboxylic acid | Molar ratio | Solvent | Amount of moisture in solution (% by weight) | Liquid property | Appearance 1 | Appearance 2 | Crack |
|---|---|---|---|---|---|---|---|---|---|---|
| 1 | Zn | $NO_3^-$ | maleic acid | 1.5 | MMB | 4 | transparent | uniform | uniform | Absent |
| 2 | | | | | MMB/water = 90/10 (wt %) | 12.5 | | | | |
| 3 | | | phthalic acid | | MMB | 4 | | | | |
| 4 | | | trimellitic acid | | | | | | | |
| 5 | | | citraconic acid | | | | | | | |
| 6 | | | maleic anhydride | | MMB/water = 90/10 (wt %) | 12.5 | | | | |
| 7 | | | maleic acid | | water | 86 | | | | |
| 8 | | | | 2 | | 84 | | | | |
| 9 | | | | 3 | | 81 | | | | |
| 10 | | | | 1.5 | methanol | 4 | | | | |
| 11 | | | | | ethanol | | | | | |
| 12 | | | | | ethylene glycol | | | | | |
| 13 | | | | | propylene glycol | | | | | |
| 14 | | | | | n-methyl-pyrrolidone | | | | | |
| 15 | | $CH_3COO^-$ | | | water | 86 | | | | |
| 16 | | acetyl acetone | | | | | | | | |
| 17 | | Cl | | | | | | | | |
| 18 | | Br | | | MMB | | | | | |
| 19 | | butoxide | | | | 0.08 | | | | |
| 20 | Ti | Isopropoxide | | | | | | | | |
| 21 | Mg | $NO_3^-$ | | | | | | | | |

TABLE 1-continued

| Example | Metal | Anion | Polyvalent carboxylic acid | Molar ratio | Solvent | Amount of moisture in solution (% by weight) | Liquid property | Appearance 1 | Appearance 2 | Crack |
|---|---|---|---|---|---|---|---|---|---|---|
| 22 | Ca | | | | | | | | | |
| 23 | Sr | | | | | | | | | |
| 24 | Ba | | | | | | | | | |
| 25 | Y | | | | | | | | | |
| 26 | Ti | | | | | | | | | |
| 27 | Zr | butoxide | | | | | | | | |
| 28 | Hf | $NO_3^-$ | | | | | | | | |
| 29 | Nb | | | | | | | | | |
| 30 | Ta | | | | | | | | | |
| 31 | Cr | | | | | | | | | |
| 32 | W | | | | | | | | | |
| 33 | Fe | | | | | | | | | |
| 34 | Ni | | | | | | | | | |
| 35 | Cu | | | | | | | | | |
| 36 | Ag | | | | | | | | | |
| 37 | Al | | | | | | | | | |
| 38 | Ga | | | | | | | | | |
| 39 | In | | | | | | | | | |
| 40 | Si | ethoxide | | | | | | | | |
| 41 | Sn | $NO_3^-$ | | | | | | | | |
| 42 | Sb | | | | | | | | | |
| 43 | In + Sn | | | | | | | | | |
| 44 | In + Zn | | | | | | | | | |
| 45 | Sn + Zn | | | | | | | | | |
| 46 | Sb + Sn | | | | | | | | | |

Comparative Examples 1 to 13

Similar operations to those in Example 1 were carried out except that zinc nitrate was used as the metal salt, and the type and the amount of the carboxylic acid etc., were changed. In addition, the observation was carried out similarly to Example 1. The results are shown in Table 2. It is to be noted that the metal complex thin film and the metal oxide thin film formed on the surface of the substrate had a film thickness falling within the range of not less than 0.05 μm and not more than 1 μm.

In Examples 1 to 46, the polyvalent carboxylic acid having a cis-form structure of —C(COOH)═C(COOH)— was mixed with 1.5 times the metal salt in a molar ratio and dissolved in the solvent; however, in any of the Examples, the properties of the solution (i.e., metal salt-containing composition) exhibited a transparent liquid. Therefore, uniform application by spin coating on a slide glass was enabled. In addition, the metal complex thin film formed on the substrate after the primary drying was uniform, and neither turbidity nor crack was found.

TABLE 2

| Comparative Example | Metal | Anion | Carboxylic acid etc. | Molar ratio | Solvent | Amount of moisture in solution (wt %) | Liquid property | Appearance 1 | Appearance 2 |
|---|---|---|---|---|---|---|---|---|---|
| 1 | Zn | $NO_3^-$ | None | 0 | MMB | 4 | transparent | generation of turbidity and crack | generation of turbidity and crack |
| 2 | | | maleic acid | 0.2 | | | | nonuniformity found | nonuniformity found |
| 3 | | | | 5 | | | | | |
| 4 | | | fumaric acid | 1.5 | | | | generation of turbidity and crack | generation of turbidity and crack |
| 5 | | | succinic acid | | | | | | |
| 6 | | | succinimide | | | | | | |
| 7 | | | isophthalic acid | | | | insoluble | failure in application | failure in application |
| 8 | | | terephthalic acid | | | | | | |
| 9 | | | pyromellitic acid | | | | gelated | | |
| 10 | | | citric acid | | | | transparent | generation of turbidity and crack | generation of turbidity and crack |
| 11 | | | oxalic acid | | | | gelated | failure in application | failure in application |
| 12 | | | diethanolamine | | | | | | |
| 13 | | | acetyl acetone | | | | transparent | generation of turbidity and crack | generation of turbidity and crack |

On the other hand, in Comparative Examples 7 to 9, 11 and 12, even though the metal salt, the carboxylic acid etc., were mixed with the solvent, dissolution failed, or immediately gelated to result in failure in applying on the slide glass by spin coating. Moreover, although a transparent solution was obtained in other Comparative Examples, observation of the substrate after the primary heating revealed that the thin film got turbid, or the surface exhibited nonuniformity and generation of crack. Such a state was maintained on the substrate also after the secondary heating.

(Metal Complex Formed After Primary Drying)

Zinc nitrate hexahydrate in an amount of 0.8924 g (0.003 mol), 0.5221 g (0.0045 mol) of maleic acid, 7 g of methanol and 1 g of water were mixed, and the mixture was subjected to a treatment in an ultrasonic bath for 10 to 30 min to allow for dissolution. Thereafter, the solvent was evaporated to give blight white powders. When the powders were heated at 150° C. for 10 min, the color of the powders changed into yellowish brown.

The yellowish brown powders were dissolved in a $CDCl_3$ solution, and subjected to determination on a $^1$H-NMR spectrum but no peak was revealed. On the other hand, the powders were dissolved in a $D_2O$ solution, and similarly subjected to determination on a $^1$H-NMR spectrum. Thus observed spectrum exhibited a peak at a position suggesting chemical shift, showing a shift to a lower magnetic field as compared with the NMR spectrum of maleic acid alone.

When maleic acid not bound by zinc remains, the maleic acid is dissolved in the $CDCl_3$ solution; therefore, the sample prepared by dissolving the aforementioned yellowish brown powders in the $CDCl_3$ solution should have exhibited the NMR spectrum in which observation of maleic acid was indicated. However, since maleic acid was not observed in the NMR spectrum, taking into consideration from the state of chemical shift indicated in the spectrum obtained when dissolved in the $D_2O$ solution, the powders were presumed to be a complex of zinc and maleic acid at a ratio of 1:1.

In addition, also a solution prepared by dissolving a bivalent metal salt other than zinc and a polyvalent carboxylic acid other than maleic acid having a cis-form structure of —C(COOH)═C(COOH)— was subjected to a study similarly to those described above, and consequently chemical shift presumed to indicate a complex of metal and maleic acid at a ratio of 1:1 was observed in the NMR spectrum. Therefore, it was supposed that a thin film of the metal complex represented by the following formula was formed on the surface of the substrate after the primary drying step. It should be noted that M is a bivalent metal in the following formula.

[Chemical formula 1]

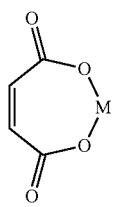

(Electron Micrograph of the Surface of the Substrate)

Figure 2:
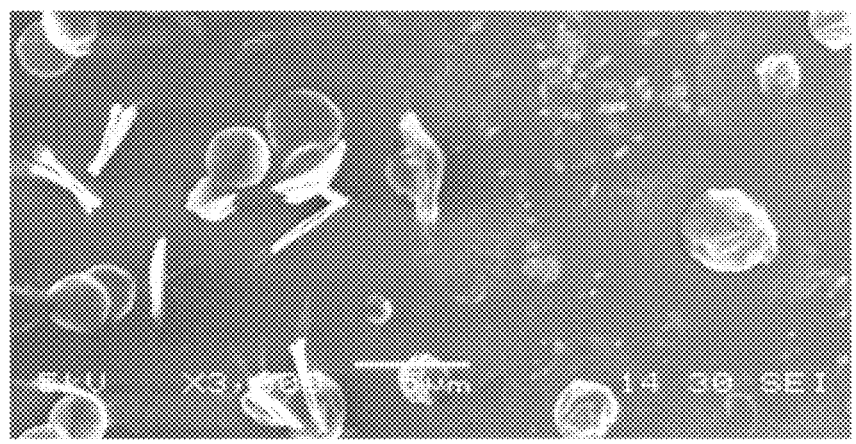
FIG. 2 shows an SEM photograph illustrating the surface of the substrate after primary heating of Comparative Example 1.
Figure 3:
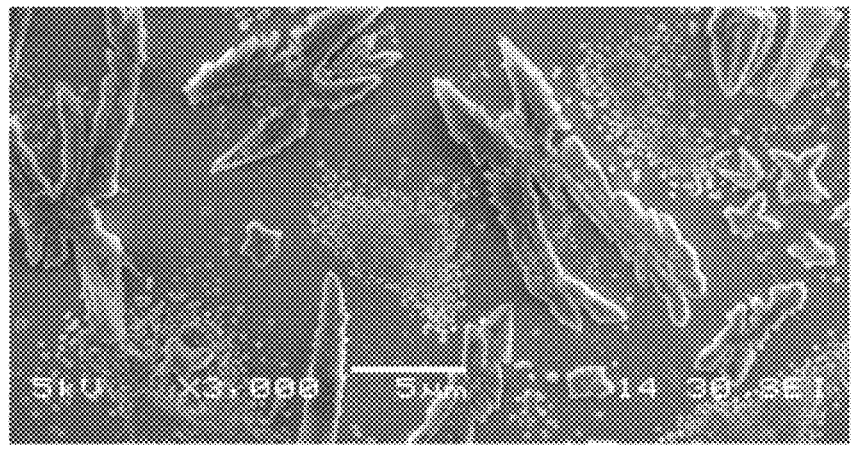
FIG. 3 shows an SEM photograph illustrating the surface of the substrate after primary heating of Comparative Example 4.
Figure 4:
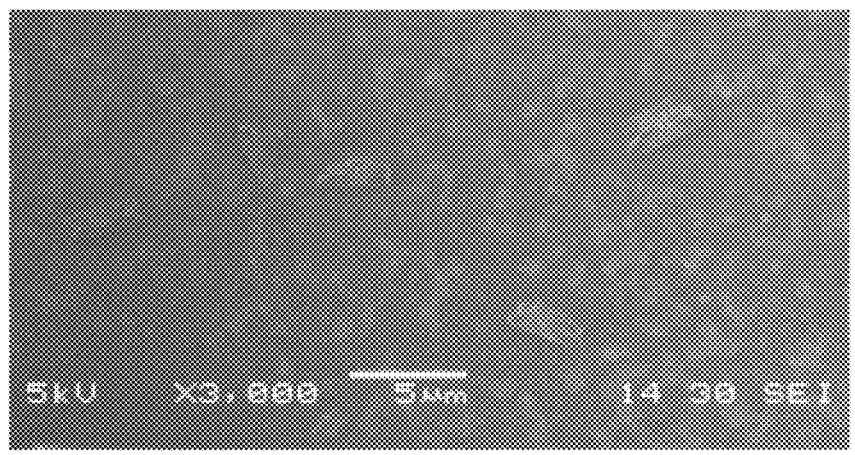
FIG. 4 shows an SEM photograph illustrating the surface of the substrate after primary heating of Comparative Example 5.

A scanning electron microscope (SEM) photograph of the surface of the substrate (surface on which the application liquid was spin coated) after the primary heating of the substrate produced in Example 1 is shown in FIG. 1. In addition, SEM photographs of the surface of the substrate (surface on which the application liquid was spin coated) after the primary heating of the substrates produced in Comparative Examples 1, 4 and 5 are shown in FIGS. 2, 3 and 4, respectively.

The surface of the substrate of Example 1 was uniform, and formation of a compact metal complex thin film was verified. On the other hand, formation of aggregates and formation of a poorly compact film were verified on the substrate of Comparative Example 1; formation of the aggregates was verified on the substrate of Comparative Example 4; and formation of aggregates was verified and formation of a uniform and compact film failed on the substrate of Comparative Example 5.

Figure 5:
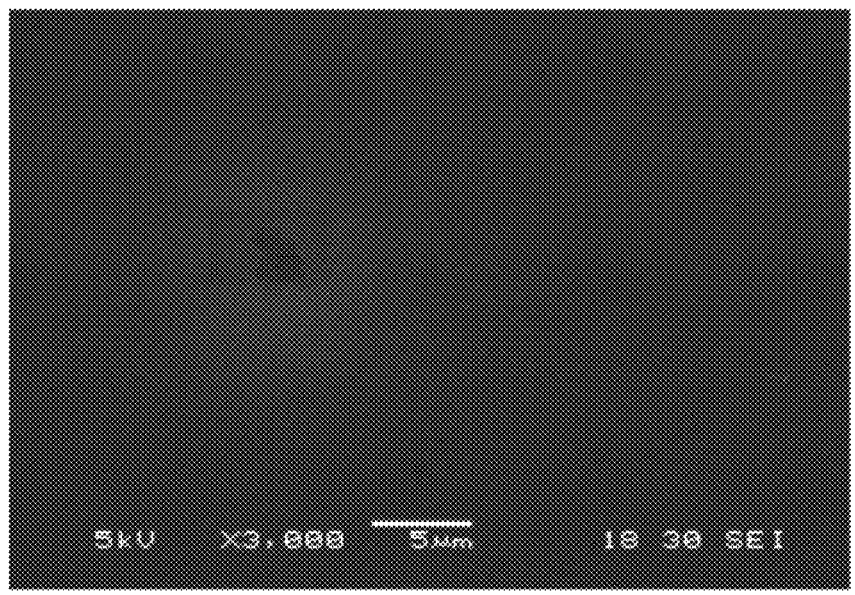
FIG. 5 shows an SEM photograph illustrating the surface of the substrate after secondary heating of Example 1.
Figure 6:
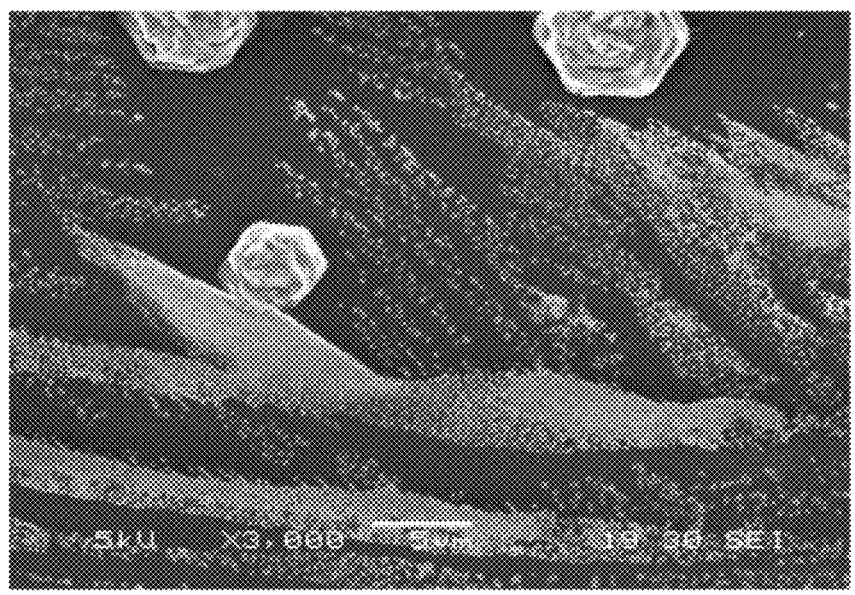
FIG. 6 shows an SEM photograph illustrating the surface of the substrate after secondary heating of Comparative Example 1.
Figure 7:
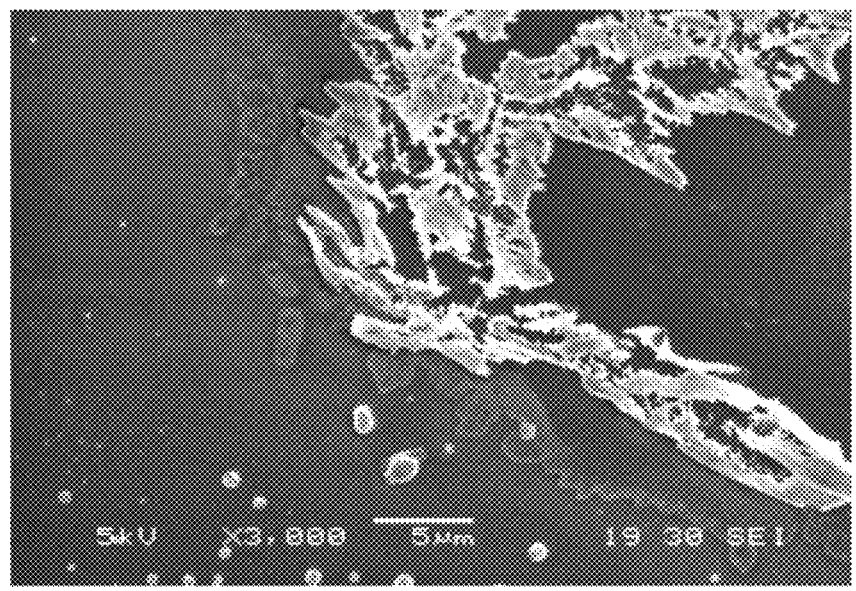
FIG. 7 shows an SEM photograph illustrating the surface of the substrate after secondary heating of Comparative Example 4.
Figure 8:
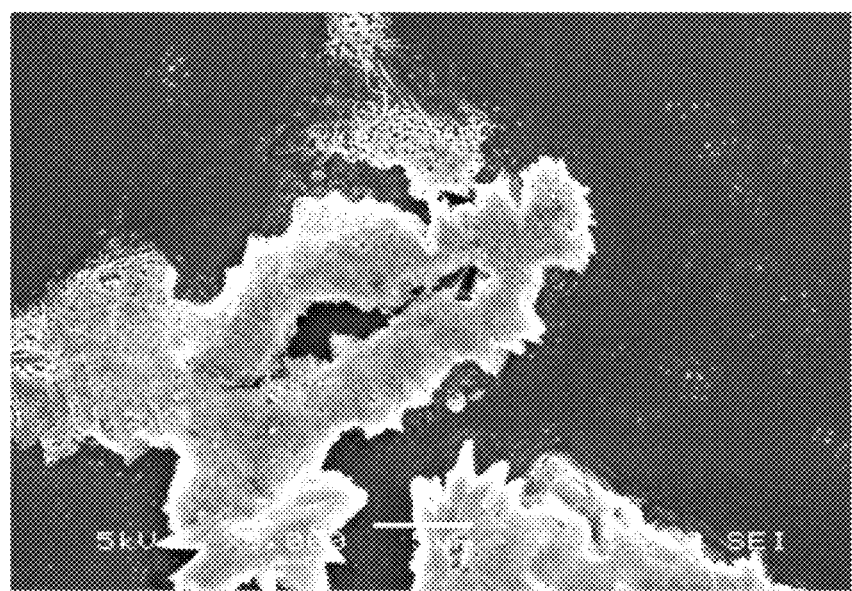
FIG. 8 shows an SEM photograph illustrating the surface of the substrate after secondary heating of Comparative Example 5.

Furthermore, a scanning electron microscope (SEM) photograph of the surface of the substrate (surface on which the application liquid was spin coated) after the secondary heating of the substrate produced in Example 1 is shown in FIG. 5. In addition, SEM photographs of the surface of the substrate (surface on which the application liquid was spin coated) after the secondary heating of the substrates produced in Comparative Examples 1, 4 and 5 are shown in FIGS. 6, 7 and 8, respectively.

The surface of the substrate of Example 1 was uniform, and formation of a compact metal oxide thin film was verified. On the other hand, the substrates of Comparative Examples 1, 4 and 5 were nonuniform, and many cracks were found, not suggesting a practically applicable value as a substrate on which a metal oxide thin film was formed.

(Secondary Heating Temperature)

The secondary heating had to be carried out at a temperature of no lower than 400° C., and a temperature of 500° C. was employed in the foregoing Examples. The upper limit temperature of the secondary heating is determined preferably depending on the heatproof temperature of the substrate. For example, in the case of substrates having a heatproof temperature lower than slide glasses, the secondary is heating preferably carried out at a temperature around 400° C., whereas in the case of substrates having a heatproof temperature higher than slide glasses to the contrary, the secondary heating can be carried out at a high temperature approximate to the heatproof temperature.

Effects of Primary Heating

Comparative Example 14

Entirely similar operations to those in Example 1 were carried out except that the substrate was heated (baked) in the air in an electric muffle furnace at 500° C. for 30 min without heating in the air dry furnace at 150° C. for 10 min, after the prepared solution was spin coated on a slide glass. Then, the appearance of the metal oxide thin film formed on the surface of the substrate was observed. In other words, the primary heating in Example 1 was omitted to form a metal oxide thin film on the substrate.

Figure 9:
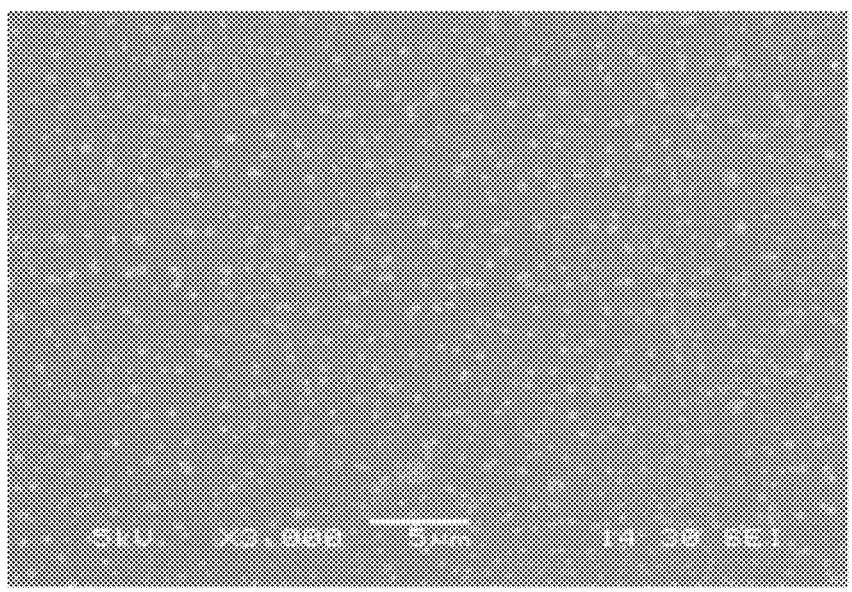
FIG. 9 shows an SEM photograph illustrating the surface of the substrate of Comparative Example 14.

As a result of observation of the appearance of the surface of the substrate (surface on which the application liquid was spin coated) of Comparative Example 14, patchy scars were generated on the entirety although the uniformity was found to some extent. Thus, a practically applicable value as a substrate on which a metal oxide thin film was formed was not accepted. Note that an electron micrograph of the surface of the thin film of Comparative Example 14 is shown in FIG. 9. The SEM photograph reveals that fine cracks were generated.

Comparison of Example 1 with Comparative Example 14 verified that formation of a compact and uniform metal oxide thin film on the substrate failed unless the primary heating and the secondary heating were not carried out sequentially at certain temperatures even if the same application liquid was applied on the substrate.

Influences of Water Content

Comparative Example 15

Figure 10:
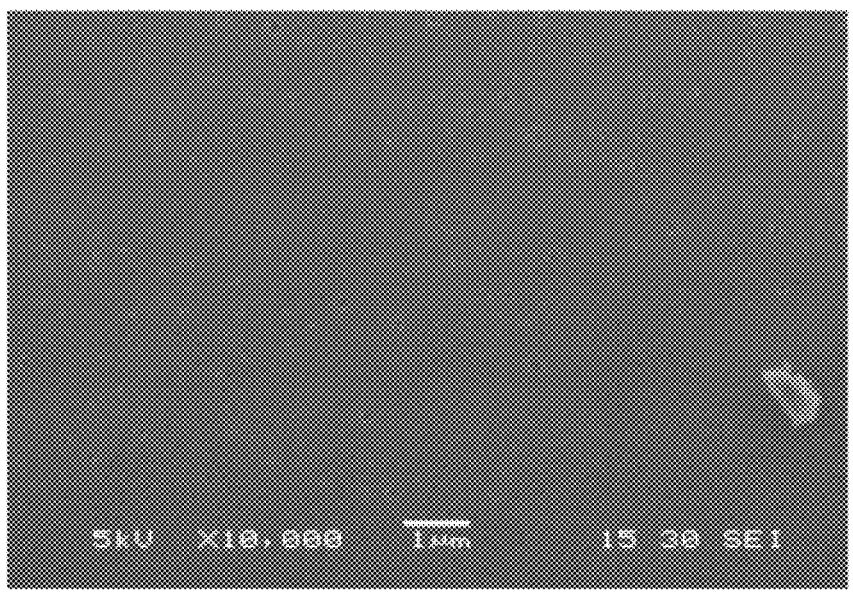
FIG. 10 shows an SEM photograph illustrating the surface of the substrate of Comparative Example 15.

Entirely similar operations to those in Example 1 were carried out except that the moisture content was set to be 0.03% by weight. Additionally, observation of the appearance and SEM photography similar to those in Example 1 were carried out. Although the observation of the appearance suggested that the surface was uniform to some extent, fine cracks were confirmed to be generated on the whole surface when viewed on the SEM photograph. Note that an SEM photograph of the surface of the substrate (surface on which the application liquid was spin coated) of Comparative Example 15 is shown in FIG. 10.

Comparison of Example 1 with Comparative Example 15 verified that formation of a compact and uniform metal oxide thin film on the substrate failed unless the moisture was contained in the application liquid.

From the description hereinabove, many modifications and other embodiments of the present invention are apparent to persons skilled in the art. Accordingly, the foregoing description should be construed merely as an illustrative example, which was provided for the purpose of teaching best modes for carrying out the present invention to persons skilled in the art. Details of the construction and/or function of the present invention can be substantially altered without departing from the spirit thereof.

INDUSTRIAL APPLICABILITY

The metal salt-containing composition, the substrate, the method for manufacturing the substrate of the present invention are useful in a semiconductor field and the like such as in manufacturing a substrate having a coating film, a transparent electric conductive film, etc.

The invention claimed is:

1. A method for manufacturing a substrate having an oxidized metal thin film formed on the surface thereof, the method comprising:
   an application step of applying on the surface of the substrate a solution comprising
   a Zn and/or In metal salt,
   a polyvalent carboxylic acid having a cis-form structure of —C(COOH)=C(COOH)—, and
   a solvent,
   the molar ratio of the polyvalent carboxylic acid to the Zn and/or In metal salt being not less than 0.5 and not more than 4.0, and the moisture content of the solution being not less than 4% by weight;
   a primary heating step of drying by heating the solution at a temperature of not lower than 100° C. and not higher than 150° C.; and
   a secondary heating step of further heating the substrate after the primary heating step at a temperature no lower than 400° C. and no higher than 500° C. thereby forming the oxidized metal thin film formed on the surface of the substrate.

2. The method for manufacturing a substrate according to claim 1, wherein the metal salt is at least one metal salt selected from the group consisting of a nitric acid salt, a sulfuric acid salt, a carboxylic acid salt, a halide, an alkoxide and an acetyl acetone salt.

3. The method for manufacturing a substrate according to claim 1, wherein the polyvalent carboxylic acid is at least one selected from the group consisting of maleic acid, citraconic acid, phthalic acid and trimellitic acid.

4. The method for manufacturing a substrate according to claim 1, wherein the content of the metal salt in the solution is not less than 0.005 mol/L and not more than 1 mol/L.

5. The method for manufacturing a substrate according to claim 1, wherein the substrate is a glass or silicon substrate.

* * * * *